United States Patent [19]

Seiden

[11] 3,796,485
[45] Mar. 12, 1974

[54] TWIN LENS CAMERA SYSTEM HAVING SEQUENTIAL OR SIMULTANEOUS LENS OPERATION

[75] Inventor: Myron A. Seiden, Needham, Mass.

[73] Assignee: Polaroid Corporation, Cambridge, Mass.

[22] Filed: Sept. 15, 1972

[21] Appl. No.: 289,443

Related U.S. Application Data

[63] Continuation-in-part of Ser. No. 214,633, Jan. 3, 1972, Pat. No. 3,760,702.

[52] U.S. Cl......... 354/88, 355/53, 355/54, 354/118
[51] Int. Cl. .......................................... G03b 35/08
[58] Field of Search .............. 95/18, 37; 355/53, 54

[56] References Cited
UNITED STATES PATENTS
1,820,113  8/1931  Bettini ..................................... 95/37

| 3,558,226 | 1/1971 | Riggs ..................... 95/37 |
| 3,128,685 | 4/1964 | Kitrosser ................ 95/18 |
| 2,497,358 | 2/1950 | Huntzinger .............. 95/37 |
| 3,424,071 | 1/1969 | Schwahn ................ 95/11.5 |
| 3,726,198 | 4/1973 | Bjork ................... 95/18 X |

Primary Examiner—John M. Horan

[57] ABSTRACT

A twin lens camera system for producing multiple photographs from a single film sheet. The system includes a sliding back arrangement for movement of the film sheet so as to present different areas thereof to the twin lenses, and a logic circuit and indicator elements for denoting a suitable operational program of the system. A selector switch provides simultaneous or sequential operation of the twin lens system, and the logic circuit is responsive to either operational mode so as to indicate movement of the film sheet following operation of both lens systems.

11 Claims, 8 Drawing Figures

TWIN LENS CAMERA SYSTEM HAVING SEQUENTIAL OR SIMULTANEOUS LENS OPERATION

CROSS REFERENCES TO RELATED APPLICATIONS

This application is a continuation-in-part of U.S. Pat. application Ser. No. 214,633 of Myron A. Seiden filed on Jan. 3, 1972, now U.S. Pat. No. 3,760,702 and entitled TWIN LENS CAMERA SYSTEM WITH SLIDING BACK.

BACKGROUND OF THE INVENTION

1. Field of the Invention

This invention relates to photographic systems and more particularly to photographic systems for producing more than one photograph from a single sheet of photographic material.

2. Description of the Prior Art

The aforementioned parent application provides a simplified camera system for taking multiple images on a single sheet of film. Preferably, it embodies a twin lens camera system which in conjunction with relative movement between a film sheet and the lenses provides four photographs on the single film sheet. In this arrangement, the camera is a so called "Self-developing Camera System" having a back section, movable between two positions so as to present different areas of the film sheet to the dual optical system. In operation of the camera system, the back section is placed at a first position and the dual optical systems are triggered to record a pair of images in side by side relation. Thereafter, the back section is moved to its second location where the above step is again repeated. The film sheet is then withdrawn from the camera through a processing station of the latter. Hence, while the operation of the system, like the structure itself is greatly simplified it nevertheless requires several manual steps in sequence to produce the desired multiple photographs.

Consequently, an important object of this invention is to provide an improved camera system having control means for assuring proper operation of the system.

Another important object of this invention is to provide a camera system capable of automatically indicating to the operator the proper operational cycle to be followed.

Still another object of this invention is to provide an improved camera having a dual lens system capable of either individual or simultaneous operation responsive to shutter trigger operation.

A further object of this invention is to provide a dual lens, program indicating camera system capable of either individual or simultaneous operation of each lens system.

SUMMARY OF THE INVENTION

This invention provides a new and useful camera having a twin lens system and a sliding back, film sheet holder which facilitates the presentation of different areas of the film sheet to the twin lens system. A control system provides this camera with a combination of a mechanical and electrical logic program of operation, in part automatic, with a bank of indicator lights as part of such control system, and electrical circuitry as a control element in such program, responsive in part to movement of the sliding back and providing a selection function as between simultaneous and sequential operation of the elements of such twin lens system. In this arrangement, mechanical movement of a film sheet holder, to present different areas of the film to a twin pair of optical systems, is combined with electrical switching as between the optical systems to selectively expose different portions of each of such film areas; such exposure being selected as simultaneous or sequential by means of a switch setting by an operator.

The structure of the herein illustrated embodiment of this invention includes a main body camera housing in which a twin pair of optical systems is provided as a means of forming images of a subject or subjects at a focal plane. This arrangement thus can form an image in each of two side by side portions of one area of a sheet of photographic film which is one half of the available area of the film sheet. Attached to the main housing is a camera back housing, carrying a sheet of photographic material at the focal plane, and which is slidable, in its attachment to the main housing, in a straight line shuttle movement between two positions so as to present one half of the available area of the sheet to both the optical systems at one of its positions, and to present the other half of the film at the other position. At each such position the selector switch gives the option of simultaneous or sequential operation of the optical systems.

A control system is provided as a means of operating this camera system on an unidirectional logic program basis to assure proper operation. In the illustrated embodiment, this control system includes automatic indicator signals, which, if followed by the operator, will assure proper operation of the camera in a logic cycle of sequential operational steps. These signals relate to movement of the camera back between its two positions following the taking of two pictures individually or separately in each respective position, to the operation of electronic flash units used in taking each picture, and to the pulling of a photographic material "pull tab" in the course of treatment and removal of such material from the camera system.

Another form of such control is a selector switch and automatic electrical circuitry therewith, for establishing the operation of the twin optical systems as simultaneous or sequential.

BRIEF DESCRIPTION OF THE DRAWINGS

The novel features that are considered characteristic of the invention are set forth with particularity in the appended claims. The invention itself, however, both as to its organization and its method of operation together with additional objects and advantages thereof, will best be understood from the following description of the preferred embodiment when read in connection with the accompanying drawings wherein like numbers have been employed in different figures to denote the same parts and wherein:

DESCRIPTION OF THE PREFERRED EMBODIMENT

Figure 1:
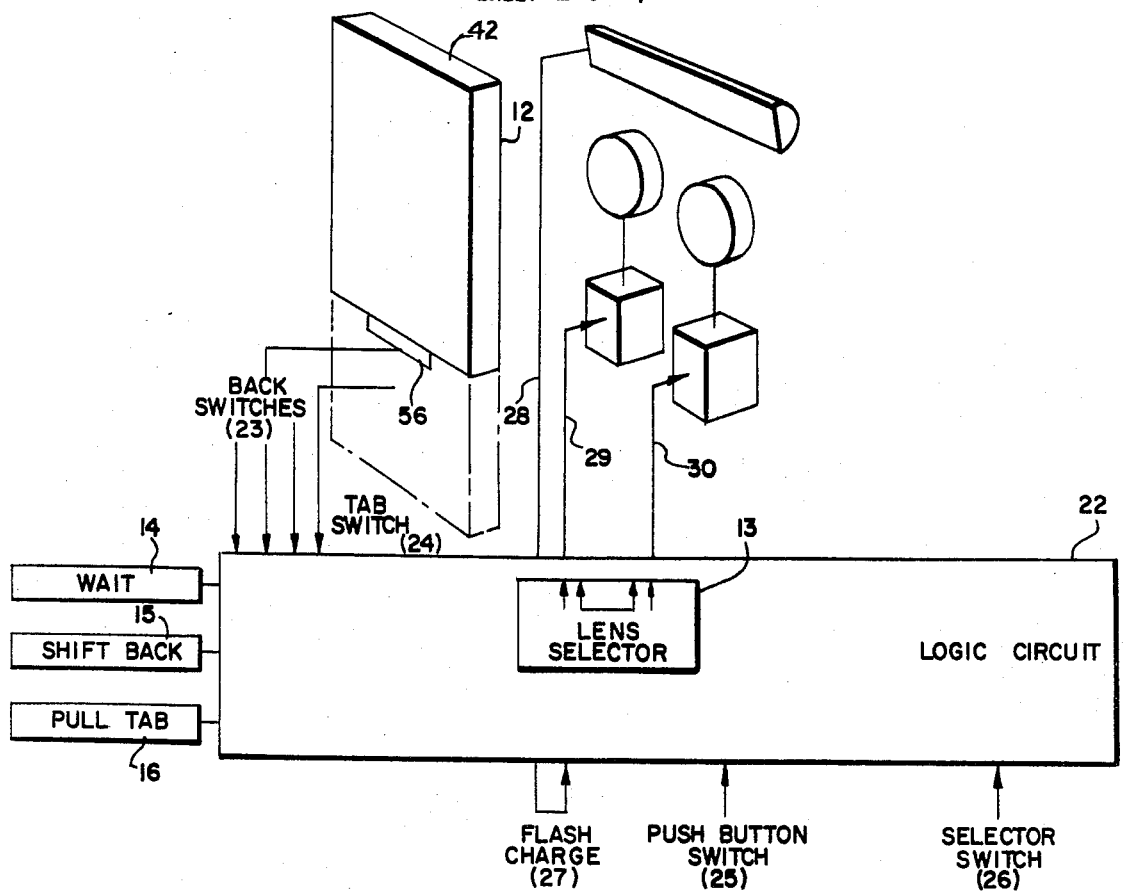
FIG. 1 is a schematic illustration of a camera system and a logic program control electrical circuit therefor, according to this invention.

As illustrated in FIGS. 1–4, the camera system is based on a pair of lens units 10 and 11 as optical system components for forming subject images of a given size at a focal plane 12, at which a sheet of film, also indicated as 12, is mounted. Aligned with the focal plane is a camera back or film sheet holder 42 which is configured for up and down sliding movement in the focal plane. A septum 12a is mounted between the lens units 10 and 11 so as to confine the image rays from each lens to a separate quadrant of the film sheet 12. As the camera back is moved up and down, see FIG. 4, the film sheet 12, which is four times the given size of any one image, is also moved up and down, at and along the focal plane such that at either location, one-half of the film sheet is positioned behind the lens units 10 and 11 whereby they can form images respectively in these sheet areas. A pair of solenoid operated shutters schematically indicated at 18 and 19 in FIG. 1 are used to operate the lens units 10 and 11 respectively. A flash illuminator unit 20 and aiming light unit 21 are also shown in conjunction with this system.

Further, as indicated at 22 in FIG. 1, an electrical-electronic logic circuitry including directional indicators denoting WAIT, SHIFT BACK and PULL TAB directions is employed in this camera system. This circuit while similar to the system described in the commonly assigned U. S. Pat. application Ser. No. 77,916 of Albion P. Bjork et al. filed Oct. 5, 1970 also includes a lens selector unit 13 which, in conjunction with a selector switch 26, provides means for selectively providing simultaneous or sequential operation of the lens systems 11 and 12, or more particularly of the shutter devices 18 and 19 responsive to actuation of the pushbutton shutter switch 25.

Inputs to the circuit system 22 include a set of switches 23 which are responsive to the movement of the camera back 42; a tab switch 24 responsive to the action of pulling the film tab; a flash unit 27 in continuous charge connection to a condenser unit in the circuit system 22; a switch 25 which is responsive to the pushbutton action in operation of the camera system; and a selector switch 26 for establishing operation of the selector unit 13 so as to enable the lens systems 11 and 12 for either simultaneous or sequential operation.

The logic circuit 22, through its selector circuit 13 (as subsequently explained in detail in regard to FIG. 8) and its output leads 28 and 30, control both shutter arrangements 18 and 19 in accordance with operation of the pushbutton switch 25. Triggering of these shutters, in turn, switches on a SHIFT BACK signal 14. The latter is then extinguished upon movement of the back to a new location in accordance with operation of the back switch 63 as later explained in detail in regard to the overall operation of the unit. Additionally, operation of the pushbutton switch 25 fires the flash charge unit 27. The reduction in charge automatically turns on a WAIT signal 15, and the latter is then extinguished when the charge again reaches a suitable level. Finally, as later explained in detail with regard to the overall operation of the camera system, back switches 64 and 65 and the tab switch 24 control the operation of a PULL TAB signal 16.

Figure 8:
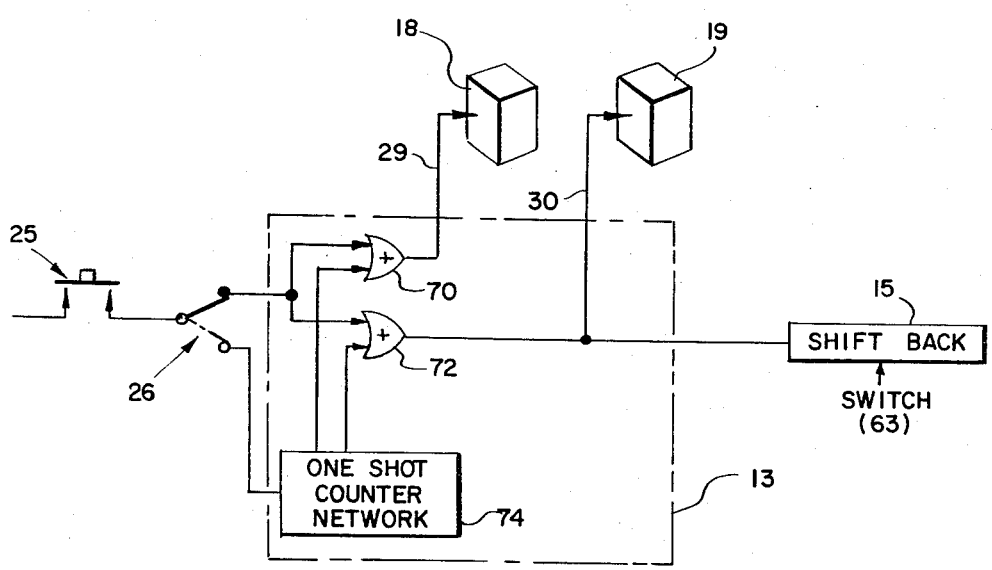
FIG. 8 is a detailed schematic illustration of the lens selector unit of FIG. 1.

Referring now to FIG. 8, the selector unit 13 is shown to include a pair of "or" networks 70 and 72 which control the shutter units 18 and 19, respectively. The input to both devices 70 and 72 are through switch 26. In one position of the latter, as shown in bold lines in this figure, both "or" devices and hence units 18 and 19 are simultaneously triggered upon operation of the pushbutton switch 25. At this time, the SHIFT BACK light which is coupled to shutter 19 is lit so as to indicate that the back should now be displaced to its other location. In the other position of the switch 26 (shown dotted) each "or" network is sequentially triggered, responsive to repetitive actuation of the switch 25, through a "one shot counter" network 74, or the like. That is, assuming switch 26 is in its "sequential" position, and hence coupled to the counter 74, the latter operates to first trigger shutter 18 (through network 70) upon a first operation of the switch 25. Then upon a subsequent operation of the latter switch (to record a second image) shutter 19 is triggered, the counter 74 resets to its initial mode, and the SHIFT BACK light is lit. Hence, it should be understood that the circuit 13 in conjunction with the SHIFT BACK indicator instructs the operator to move the camera back following the taking of both images on a given half of film sheet, and specifically provides means for actuating one of the shutters simultaneously with or subsequent to the other and means for indicating to the operator that the camera back should be moved responsive solely to actuation of the one shutter.

Figures 2, 3:
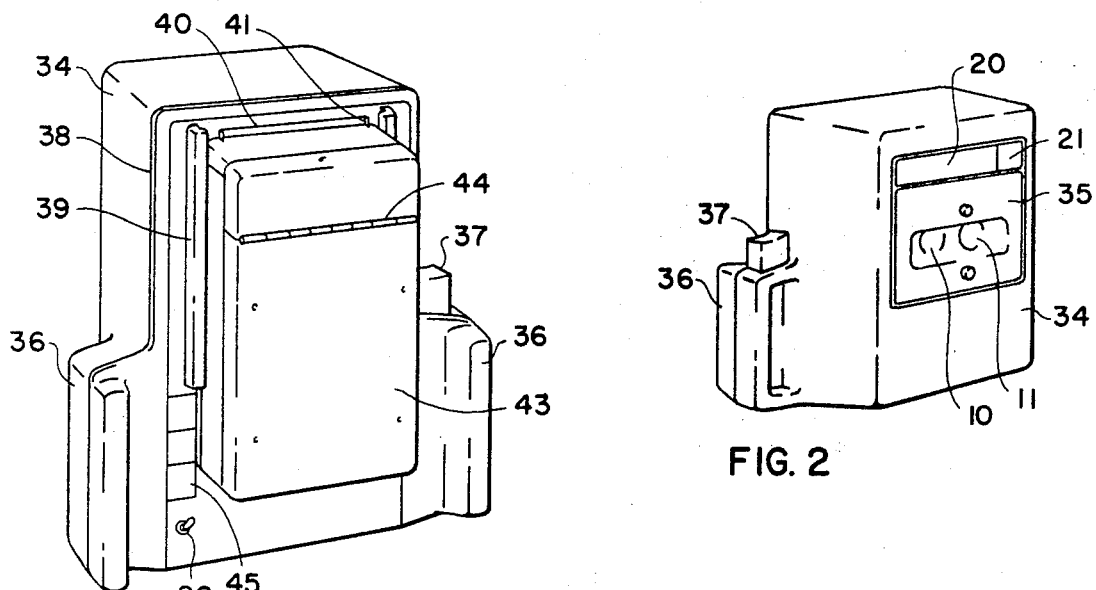
FIG. 2 is a front perspective of a camera embodying this invention.
FIG. 3 is a rear perspective of the camera of FIG. 2.

Prior to completing the description of the camera circuitry and its operation, it is advantageous to discuss the external views of FIGS. 2 and 3 which show a main body camera housing 34, with the lens units 10 and 11 and the flash and aiming light units 20 and 21, in a front panel 35. This housing has side handles 36 and a camera operating pushbutton 37. FIG. 3, in particular, shows a camera back plate 38 mounted on the back of the main housing 34. A pair of vertical and parallel guide rails 39 are mounted on the rear of the back plate 38, with the top end of a back baffle plate 40 showing parts of side edges 41 out-turned rearwardly therefrom. The baffle plate 40 is mounted on the back plate 38 between the guide rails 39. A camera back housing 42 is attached to the main housing 34 by being slidably mounted with protruding side edges under the overhand of the guide rails 39. The back 42 has an openable cover 43, hinged at 44. A set of indicator lights 45 (WAIT, SHIFT BACK, PULL TAB) are mounted on the back plate 38, as is the selector switch 26.

Figure 4:
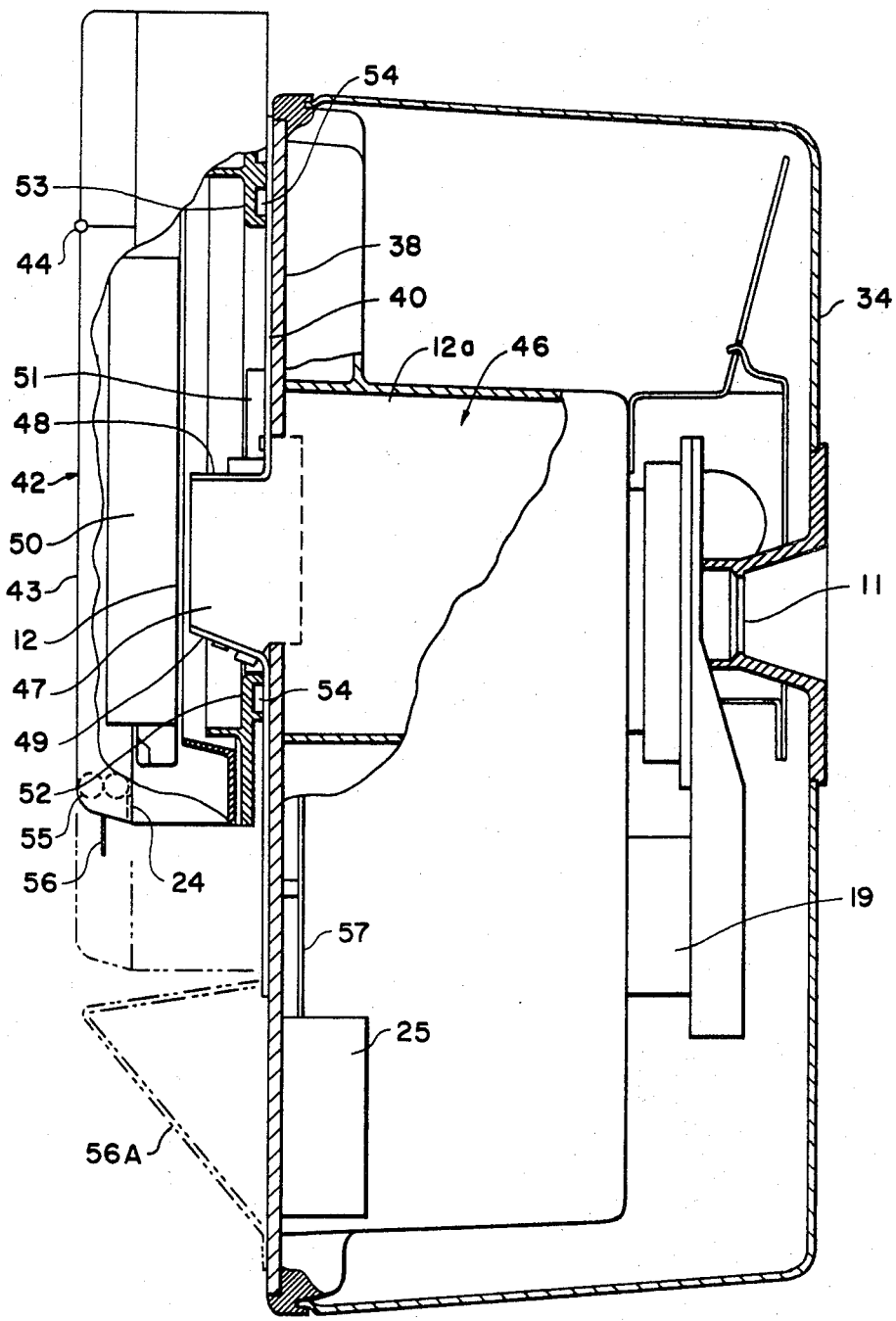
FIG. 4 is a comprehensive showing of much of a camera system embodying this invention, in the form of a side elevation, partially cut away and partially sectional.

In FIG. 4, a light passage 46 extends from the lens unit 11 (and 10) back through the camera. The passage 46 is divided in two by the septum 12A. The back plate 40 and the baffle plate 38 have openings therethrough in continuance of the passage 46, and divided by a septum extension 47. The back baffle plate 40 has somewhat horizontally extending baffles 48 and 49 at the top and bottom of the baffle plate light opening. The septum extension 47 and the baffles 48 and 49 extend to a point closely adjacent the film sheet-focal plane 12. Thus a light passage to the focal plane is provided from each lens unit 10 and 11 to a quadrant of the film sheet and each quadrant is generally defined by these baffles, the septum extension and the inner side walls of the back housing 42. A film pack is indicated at 50, presenting a sheet of film at the focal plane 12.

Further, in FIG. 4, one of a pair of stop bars 51 is shown, mounted on the baffle plate 40 and secured to the back plate 38 through mounting bolts extending through the baffle plate. The stop bars 51 limit the up and down movement of the camera back 42. In the up position, as shown, the lower ends of the stop bars 51 engage interior abutments 52 as part of the camera back unit. In the down position of the camera back, the fixed stop bars engage other interior abutments 53 within the camera back. These stop arrangements assure the alignment of the two halves of the photographic sheet with the baffle plate light aperture and thus properly with the lens systems, in each of the two positions of the camera back. As part of the light barrier system of this device, a pair of cross channels 54 in the sliding face of the camera back 42 have strips of napped material therein, such as velvet or felt, for sideways sliding engagement with the rear face of the baffle plate 40, as the camera back is moved up and down.

Also in FIG. 4, in the back unit, a pair of rollers 55 are shown, for spreading developer fluid over an exposed sheet of film as the film is pulled through the rollers. This structure and the whole camera back is essentially that of the Polaroid Land Camera back model CB100 marketed by Polaroid Corporation of Cambridge, Mass. A pull tab is indicated at 56, and a pull-preventer at 56a.

Again in FIG. 4, in the camera back 42 and adjacent the rollers 55, the pull tab switch 24 is shown. Inside the main camera body 34 an extension 57 of the pushbutton 37 of FIG. 2, is carried into a switch unit 25, such that the latter is operable in consequence of the up and down movement of the spring return pushbutton 37.

Figure 5:
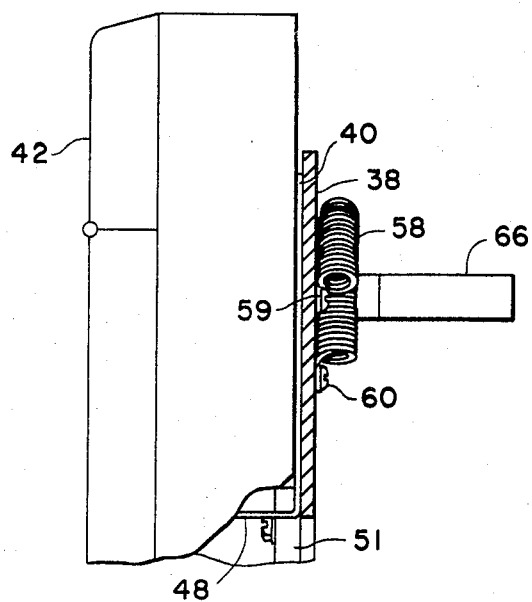
FIG. 5 is a fragmentary and cut-away showing of the top portion of a system according to this invention, in illustration of the camera back movement spring and a magnet on the control system.
Figure 6:
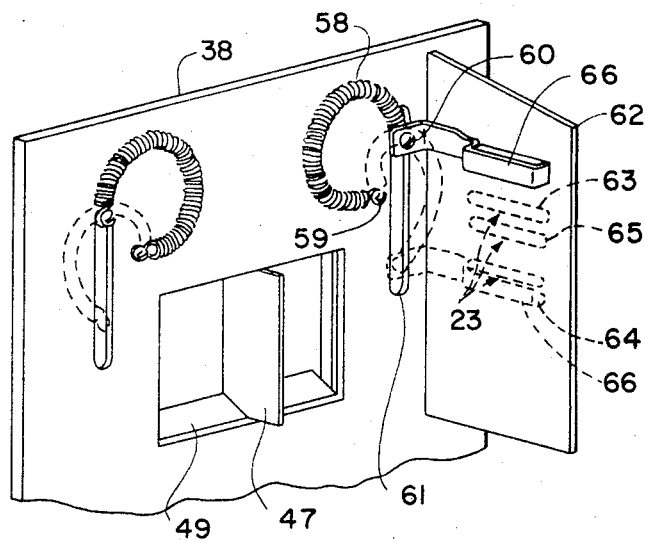
FIG. 6 is a further view of the structure of FIG. 5, additionally showing a circuit board for the control system.

In FIGS. 5 and 6, a set of overcenter springs 58 is shown. Each is mounted in a loop form, with one end pivotally secured at 59 to the front of the back plate 38 and the other end pivotally secured at 60 to the inner face of the sliding back 42, through a slot 61 in the back plate 38. With the camera back 42 in the up position, the springs 58 are in the solid line position shown in FIG. 6 biasing the camera back in a holding effect upwards, with the camera back in the down position, the springs 58 are in the dotted line position shown, and biasing the camera back in a holding effect downwards.

FIG. 6 further shows a circuit board 62 for mounting at least part of the logic circuit of this system, including the back switches 23. This is a set of need switches. Switch 63 is in the circuit related to the shift back light; switch 64 is an enabler in the pull tab light system; and switch 65 is an actuator in the pull tab light system. A magnet 66 is secured to the camera back through the connector 60 and moves therewith past the reed switches 23 to operate them as the camera back is moved.

Figure 7:
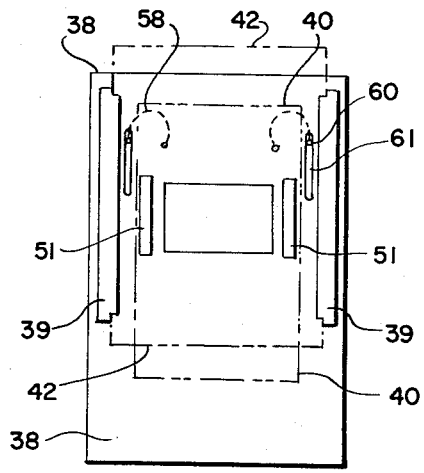
FIG. 7 is a rear view of the back plate of a camera system according to this invention, with phantom and dotted line showings of associated structure.

FIG. 7, in further explanation of the structure on the rear of the back plate 38, illustrates the guide rails 39 with phantom indications of the sliding back 42. The baffle plate 40 and the overcenter springs 58 are also illustrated herein with associated structure.

As previously indicated, the camera system of this invention is a combination of a pair of optical systems with a film sheet carried in a sliding back and a logic program control system. An electrical circuit system including a bank of indicator lights is used, in part automatically, as part of the control program. In this arrangement, the camera system includes four operator actions: (1) actuation of the pushbutton; (2) movement of the camera back, up and down; (3) the movement involved in pulling the "pull-tab" and removing exposed film from the camera; and (4) operation of the selector switch. It involves one switch in relation to the movement of the camera actuator, three switches in relation to the movement of the camera back, one switch in relation to the pulling of the "pull-tab," and the selector switch. It also involves three indicator lights: (1) WAIT; (2) SHIFT BACK; and (3) PULL TAB.

In operation of the camera, the electronic flash system for each picture is actuated to discharge as a result of actuating the camera pushbutton. This same action results at least indirectly, in the WAIT light coming on. Subsequently, this light goes out as a result of a sensor response in a suitable charging circuit for the electronic flash system. If the optical systems are sequential, this action is then repeated. Operation of both optical systems turns on the SHIFT BACK light which then goes out as a result of movement of the camera back. Movement of the camera back to one position (the down position) first enables the PULL TAB light circuit, and further movement of the camera back (following lens actuation) to the other position (the up position) turns on this light which is then turned out responsive to actuation of the "pull-tab" switch in the course of removing the exposed film from the camera when the "pull-tab" is pulled.

Assuming a starting situation is with the camera back 42 and its film sheet 12 in the up position and all lights out, if the selector switch is in position for simultaneous operation of the lens units 10 and 11, when the pushbutton 37 is depressed (closing switch 25) and both shutter mechanisms 18 and 19 are triggered and the flash system is discharged so as to simultaneously record two images, side by side, of the scene. At this time, the WAIT and SHIFT BACK lights 14 and 15 come on. The WAIT light 14 is a control signal to refrain from depressing the pushbutton until the charge circuit reaches a suitable level while the SHIFT BACK light 15 indicates a new half of the film should be presented to the lens units 10 and 11. In sequential lens unit operation, only one lens unit is used at a time, and only the WAIT light 14 comes on with the first actuation of the pushbutton. As indicated, the electrical system automatically adjusts to enable the next depression of the pushbutton, after the WAIT light goes out, to actuate only the second lens unit, or that is, shutter 19 and its associated lens unit 11. When this is done, the SHIFT BACK light 15 comes on along with the WAIT light 14. The electrical system readjusts so that the next depression of the pushbutton 37 will only actuate the first lens unit (assuming the selector switch 26 is left in its "sequential" position). The control direction, however, is to both move the back to its new location and to also refrain from actuating the pushbutton 37 until the WAIT light 14 again goes out. The SHIFT BACK light 15 is then extinguished (as explained below) in consequence of the movement of the camera back.

Accordingly, as the back is moved its magnet 66, in passing, actuates switch 63 to extinguish the SHIFT BACK light 15. The WAIT light 14 is automatically extinguished when the flash system has been recharged in accordance with the continuous charging process. Completion of the movement of the back downward carries the magnet past switch 64 with effect. Then, when the magnet reaches the switch 65, that switch is actuated to "enable" or activate, the PULL TAB light circuit including the switch 64.

In the down position of the camera back, the lens units 10 and 11 are again operated, either simultaneously or sequentially in the same manner and with the same control effects as in the up position of the back. Thus, once both lens units have been operated in the down position, and the WAIT light has been on either once or twice according to the setting of the selector switch 26, the SHIFT BACK light 15 is again automatically triggered. This indicates to the operator that the camera is again to be moved, this time back to its up position. During this movement, as the magnet passes the new enabled switch 64, that switch is actuated, and the PULL TAB light 16 comes on. As the magnet further rises and passes the switch 63, that switch is again actuated to extinguish the SHIFT BACK light 15. When the back is in its up position and the tab 56 is pulled in accordance with the indicator light and in preparation for removal of the film sheet, the switch 24 is automatically triggered so as to extinguish the PULL TAB light 16.

Consequently, the camera system provides a simple logic arrangement and instructional operating indicia adapted for separately recording four images on two pairs of images. The logic system and its instructional indicia, which automatically directs the operator through a preprogrammed sequence of steps, is converted from image taking mode to the other by single switch, and advantageously may be altered following the taking of any two side-by-side images.

Hence, this invention includes a unique system of control which is a combination of automatic and manual control, and a combination of a mechanical iterative logic program (the back movement) and, when selected, a basically electrical iterative logic program of sequential operation of the lens units. The program thus is one iterative logic sequence with an optional nesting therein of a local interpolation of another iterative logic sequence which presents a highly controlled, highly versatile system.

This invention therefore provides a unique and useful camera system for producing more than one photograph from a single sheet of photographic material and comprises a twin lens system with a film sheet carried in a movable back and a control logic program which is versatile in offering a selection of different programs by operator choice and simple selection action, such selection being available twice in one sequence, once at each of the positions of the camera back. These programs are essentially manually initiated, with automatic system aid in completion including a bank of indicator lights which provide directives of action or non-action in a system of programmed control.

As many embodiments may be made of the above invention and as changes may be made in the embodiment set forth above without departing from the scope of the invention, it is to be understood that all matter hereinbefore set forth and in the accompanying drawings is to be interpreted as illustrative only and not in a limiting sense.

What is claimed is:

1. A camera system comprising:
   a pair of optical systems for respectiVely transmitting image carrying rays along a pair of exposure paths so as to form a pair of images of a given size at a focal plane;
   means for mounting a sheet of photographic material in said focal plane, such photographic sheet being at least four times said given size;
   selectively operable shutter means for unblocking and then blocking each of such exposure paths;
   means for actuating said shutter means to substantially simultaneously or sequentially unblock and block each of such exposure paths when either a first or second area of such photographic sheet is located in operative relation to said optical systems;
   means for achieving relative movement between said optical systems and said mounting means to sequentially present such first and second areas of such sheet of photographic material to said optical systems whereby such a first area may be first exposed to record a pair of images thereon and, after relative movement has been effected between said optical systems and said mounting means, such second area may be exposed to record a second pair of images thereon, the normal operation of said camera system being devised to commence with said mounting means in a first given position with respect to said optical systems and involving a predetermined sequence of steps performed by an operator to produce a pair of images on each such first and second areas of such photographic sheet, said sequence of steps including one step of operating said shutter actuating means so as to record a first pair of images and a subsequent step of effecting relative movement between said optical systems and said mounting means following the operation of said shutter means; and
   means responsive to the performance by the operator of said one step for indicating to the operator that said subsequent step is to be taken by him in conforming with said predetermined sequence of steps.

2. The camera system of claim 1 wherein said shutter means includes a pair of shutters, and said actuating means includes means for actuating said shutters, and wherein said means for indicating is responsive to actuation of both said shutters.

3. The camera system of claim 1 wherein said actuating means includes means for actuating one of said shutters simultaneously with, or subsequent to, the other of said shutters and wherein said indicating means is responsive solely to actuation of said one shutter.

4. The camera system of claim 1 wherein said camera system is of the self-developing type including means for spreading a processing fluid across such sheet of photographic material responsive to such sheet of photographic material being withdrawn from said camera system, said sequence of steps includes the relative movement between said optical systems and said mounting means and operation of said actuating means to first record a pair of images when said mounting means is in said first position, then record a pair of images when said mounting means is in a second position with respect to said optical systems and withdrawal of such sheet of photographic material from said camera system subsequent to the relocation of said mounting means in said first position, and said indicating means additionally includes means responsive to operation of both said shutter means when said mounting means is in said second location, and to relative movement to relocate said mounting means in said first position for indicating to an operator that such sheet is to be withdrawn.

5. A camera system comprising:
  a pair of optical systems for respectively transmitting image carrying rays along a pair of exposure paths so as to form a pair of images of a given size at a focal plane;
  means for mounting a sheet of photographic material in said focal plane, such photographic sheet being at least four times said given size;
  selectively operable shutter means for unblocking and then blocking each of said exposure paths, said shutter means including a pair of shutters positioned in operative relationship respectively with each of said optical systems;
  manually operative means for achieving relative movement between said optical systems and said mounting means tO Sequentially locate first and second areas of such sheet of photographic material in operative relation to said optical systems whereby such first area may be first exposed to record a pair of images thereon and, after relative movement has been effected between said optical systems and said mounting means, such second area may be exposed to record a pair of images thereon;
  selectively operable means for actuating said shutter means to substantially simultaneously or sequentially unblock and then block each of such exposure paths when one of such first and second areas of such sheet is located in operative relation to said optical systems so as to record a pair of images on such one area; and
  means responsive to the actuation of said pair of shutters to block and unblock both said exposure paths when such one area is located in such one operative position for indicating to an operator that he should effect relative movement between said optical system and said mounting means.

6. The camera system of claim 5 wherein said indicating means includes means for actuating one of said shutters simultaneously with, or subsequent to, the other of said shutters, and said indicating means is responsive solely to actuation of said one shutter.

7. The system of claim 6 for use with an electrical power source, said indicating means is a normally inoperative electrical indicator, and said actuating means includes means for coupling said indicator means to such source responsive to actuation of only said one shutter whereby said indicator is rendered operable only upon actuation of both said shutters.

8. The camera system of claim 5 wherein said indicating means comprises instructional indicia.

9. The camera system of claim 5 wherein said indicating means comprises a light source.

10. The system of claim 5 wherein said actuating means includes a selectively operable actuator member configured for actuating said shutters responsive to the operation of said actuator member by the camera operator and manually operable shutter mode selection means for coupling either both of said shutters to said actuator member so as to provide a first mode of actuation of both said shutters responsive to a single operation of said actuator member or a second mode of sequential operation of said shutters responsive to repeated operation of said actuator member.

11. The system of claim 10 for use with an electrical power source and wherein: said indicating means is an electrically operable indicator; said shutters are electrically operable; said shutter selection means includes a first network configured for simultaneously conducting firing signals to both said shutters and said indicator, a second network configured for sequentially conducting firing signals to each of said shutters in a predetermined order wherein a firing signal will be conducted to said indicator and to one of such shutters subsequent to conduction of the preceding firing signal to the other of said shutters, and a selector switch for coupling either said first or second network to said actuator member; and said actuator member includes switch means for coupling such power source to said selector switch so as to produce such firing signals responsive to operation of said actuator member.

* * * * *